Oct. 31, 1939.  E. EICHENBERGER  2,178,371
COMBINATION FLASHLIGHT AND MAGNIFYING GLASS
Filed Sept. 8, 1937
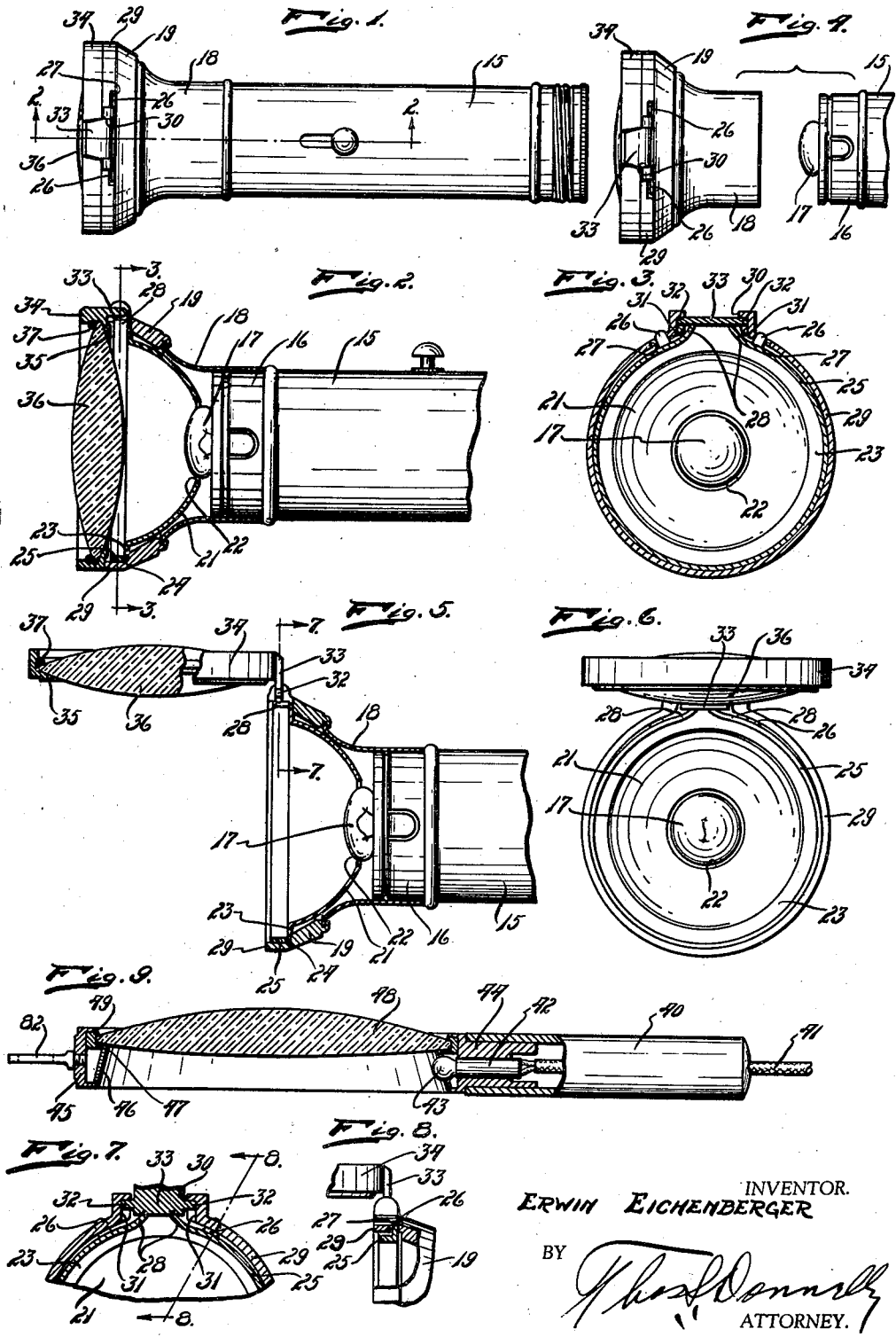
INVENTOR.
ERWIN EICHENBERGER
BY
ATTORNEY.

Patented Oct. 31, 1939

2,178,371

UNITED STATES PATENT OFFICE 2,178,371

COMBINATION FLASHLIGHT AND MAGNIFYING GLASS

Erwin Eichenberger, Detroit, Mich.

Application September 8, 1937, Serial No. 162,914

5 Claims. (Cl. 88—40)

My invention relates to a new and useful improvement in a flashlight attachment and has for its object the provision of means whereby there may be brought into position at the forward end of a flashlight, a magnifying lens through which objects illuminated by the flashlight may be observed.

Another object of the invention is the provision of an attachment which may be easily and quickly mounted on a flashlight to provide the necessary structure for magnifying the object illuminated by the flashlight.

Another object of the invention is the provision of a mechanism whereby a magnifying lens may be used as a closure for the forward end of a flashlight and moved into position for magnifying objects which may be observed therethrough and which may be illuminated by the flashlight.

Another object of the invention is the provision in a flashlight of a novel reflecting member having a magnifying lens mounted thereon so that the object illuminated may be observed through the magnifying lens.

Other objects will appear hereinafter.

The invention consists in the combination and arrangement of parts hereinafter described and claimed and will be best understood by a reference to the accompanying drawing which forms a part of this specification and in which, Fig. 1 is a side elevational view of a flashlight showing the invention applied.

Fig. 2 is a central vertical sectional view of the forward end of the flashlight taken on line 2—2 of Fig. 1.

Fig. 3 is a sectional view taken on line 3—3 of Fig. 2.

Fig. 4 is a side elevational view of the attachment showing it in separated relation to the flashlight which is shown in fragment.

Fig. 5 is a view similar to Fig. 2 illustrating the magnifying lens in position for magnifying purposes.

Fig. 6 is a front elevational view of the arrangement shown in Fig. 5.

Fig. 7 is a fragmentary sectional view taken on line 7—7 of Fig. 5.

Fig. 8 is a fragmentary sectional view taken on line 8—8 of Fig. 7.

Fig. 9 is a central longitudinal vertical sectional view of a modified form of structure.

In the drawing, I have illustrated the invention mounted on a flashlight having an elongated body portion 15 which serves as a hand grip and also serves as a casing for the batteries used to energize the light bulb 17 which projects outwardly from the forward end 16 of the gripping portion 15. An attachment is mounted on the forward end 16 and comprises a sleeve 18 flaring outwardly toward its outer end and attached to the ring 19 which serves to complete the bell-mouth structure. Positioned within this bell-mouth structure is a semi-spherical reflector 21 having the central opening 22 into which the light bulb 17 projects. A marginal outwardly turned flange 23 is adapted to rest upon a shoulder 24 formed on the inner surface of the ring 19. A split resilient band 25 engages the flange 23 and serves to retain the reflector 21 in position. This band 25 is provided adjacent each of its ends with outwardly projecting lugs 26 which extend through the openings 27 formed in the axially directed portion 29 of the ring 19. The ends of the band 25 are angularly turned outwardly as at 28. The angularly turned ends 28 of the band 25 engage against the hinge plate 33 which is mounted on and extended axially of the closure ring 34. Projecting outwardly from this hinge plate 33 are the trunnions 32. The axially directed portion 29 is cut-away as at 30 and doubled upon itself to provide channels 31 in which the trunnions 32 engage. The construction is such that the ring 34 may be rocked on the trunnions 32 as an axis. The ends 28 of the band 25 engaging against the face of the hinge plate 33 when the ring 34 is moved into closing position as shown in Fig. 1 and Fig. 2. The pressure of the ends 28 of the band 25 against the hinge plate 33 serves to resist swingable movement of the ring 34 into the position shown in Fig. 5. However, when the ring 34 is swung into the position shown in Fig. 5, the ends 28 of the band 25 will then engage the end edge of the hinge plate 33 and tend to resist swingable movement of the ring 34 into closed position.

The ring 34 is provided at one edge with the inwardly projecting flange 35 against which rests the marginal portion of the magnifying lens 36. A split resilient ring 37 is snapped into the ring 34 and serves as a retainer for retaining the lens 36 in position. This spring 37, however, may be easily removed so that the removal and replacement of the lens 36 may be easily effected. When the sleeve 18 is slipped over the forward end 16 of the flashlight and the light bulb projected into the opening 22 formed in the reflector 21, the lens 36 will serve as a closure for the forward end of the bell construction or head and when in this position, the lens will serve to intensify the light emanating from the light bulb 17.

The invention affords a means for magnifying and illuminating an object at the same time. For instance in reading gas meters, electric meters and performing other similar work, it is often difficult to read the numbers or display matter when illuminated by the flashlight. In such instances, the ring 34 would be rocked to the position shown in Fig. 5 and the flashlight used in its usual manner to illuminate the matter to be observed. The operator could then observe the illuminated subject through the magnifying lens 36. Thus, there is combined in the one article an attachment which may be easily mounted on a flashlight and afford the combination of illumination and magnification. When it is desired to use the lens 36 for magnifying purposes as shown in Fig. 5, the ring 34 may be moved into the position shown in Fig. 2 and the lens 36 used not as a closure for the forward end of the flashlight.

In Fig. 9, I have shown a slightly modified form of the structure in which a rigid handle 40 is provided. Directed through this handle is the cable 41 leading from the batteries or source of electric energy, connected to the socket 42 in which the light bulb 43 is mounted. This socket 42 is mounted in a neck 44 which seats as a snug fit in the end of the handle 40. The neck 44 projects outwardly from a ring 45 formed from any suitable material such as fibrous composition, wood, metal or the like. Positioned in this ring 45 is a reflecting ring 46 formed conical and against which the light rays impinge and from which they are reflected downwardly onto the object which is positioned beneath this ring. This reflecting ring 46 is provided adjacent its upper end with a shoulder 47 on which rests a magnifying lens 48. The flange 49 being turned over the lens 48 and serving to retain it in position. In this form, the light rays emanating from the light bulb 43 are reflected by the inner surface of the conical ring 46 and concentrated on the object which is observed through the magnifying lens 48. Thus, there is combined in this structure a means for magnifying and illuminating the object to be observed. This structure, however, differs from the structure shown in Fig. 1 in that it is a departure from the ordinary flashlight construction and the lens is never used as a closure for a flashlight shell or gripping portion. A hook 82 is mounted on the ring 45 so that the device may be hung up at convenient places when desired.

With a construction such as illustrated, the flashlight is rendered adaptable for uses additional to that which is ordinarily inhered in a flashlight. At the same time, the device is one which may be economically manufactured and which is durable in structure and compact.

While I have illustrated and described the preferred form of construction I do not wish to limit myself to the precise details of structure shown but desire to avail myself of such variations and modifications as may come within the scope of the appended claims.

What I claim as new is:

1. A device of the class described adapted for attachment to a flashlight body, comprising: a sleeve-like structure adapted for seating over the end of a flashlight body in telescoping relation, the outer end of said sleeve being flared; a reflector mounted in the outer end of said sleeve and having a central opening formed therein for accommodating a light bulb; a swingable frame mounted on the outer end of said sleeve; a magnifying lens mounted in said frame and serving as a closure for the outer end of said sleeve, said frame being swingable into position for extending said lens in a plane directed axially of said sleeve and positioned forwardly of said sleeve.

2. A device of the class described adapted for attachment to a flashlight body, comprising: a sleeve adapted for seating over the end of a flashlight body, the outer end of said sleeve being flared; a reflector mounted in said flared portion of said sleeve and having an opening formed therein for reception of a light bulb; an outwardly turned flange on said reflector; a shoulder formed on the inner side of said flared portion of said sleeve, said flange resting upon said shoulder; a split resilient band engaging in said flared portion and engaging said flange for retaining the same seated on said shoulder, the ends of said band being angularly turned and directed outwardly; a closure bearing frame swingably mounted on said flared portion, said ends of said band engaging a portion of said flange and resisting the swinging of said frame from one position to another; and a magnifying lens mounted in said frame and adapted, when in one position, for serving as a closure for the outer end of said sleeve and in another position for lying in a plane directed axially of said sleeve for magnifying objects observed therethrough while in the path of the rays from said bulb.

3. A device of the class described adapted for attachment to a flashlight body comprising, a sleeve adapted for mounting at one end in telescoping relation over the bulb bearing end of a flashlight body, the outer end of said sleeve being flared to provide a bell-like structure; a reflector mounted in the outer end of said sleeve; an outwardly turned flange on said reflector; a shoulder on the inner side of said sleeve, said flange resting on said shoulder, said sleeve terminating in an axially directed portion, there being a pair of spaced openings formed in said axially directed portion; a split resilient band positioned in said axially directed portion; a pair of lugs on said band, each of said lugs projecting through one of said openings, said band serving to retain said flange in position on said shoulder.

4. A device of the class described adapted for attachment to a flashlight body, comprising a sleeve adapted for mounting at one end in telescoping relation over the bulb bearing end of the flashlight, the outer end of said sleeve being flared to provide a bell-like structure; a reflector mounted in the outer end of said sleeve; an outwardly turned flange on said reflector; a shoulder on said outer end of said sleeve, said flange resting on said shoulder, said sleeve terminating in an axially directed portion, there being a pair of spaced openings formed in said axially directed portion; a split resilient band spring positioned in said axially directed portion; a pair of lugs on said band, each of said lugs projecting through one of said openings, said band serving to retain said flange in position on said shoulder; a closure bearing flange; a magnifying lens mounted in said frame to provide a closure; a hinge plate on said frame; a pair of trunnions on said hinge plate; a pair of channels formed on said axially directed portion for reception of said trunnions for mounting said frame swingably on said axially directed portion, the ends of said band being angularly turned and directed outwardly and engaging with the hinge plate and resisting swinging movement of said frame on its mountings, said frame when swung to one position serving as a closure for said sleeve and in another position for retaining said magnifying lens in position for magnifying illuminated objects observed therethrough.

5. A device of the class described adapted for attachment to a flashlight body, comprising: a sleeve like structure adapted for setting over the end of a flashlight body in telescoping relation, the outer end of said sleeve being flared; a reflector mounted in the outer end of said sleeve and having a central opening formed therein for accommodating a light bulb; a swingable frame mounted on the outer end of said sleeve; a magnifying lens mounted in said frame and serving as a closure for the outer end of said sleeve, said frame being swingable into position for extending said lens forwardly of said sleeve at one side thereof and extended in a plane directed axially of said sleeve; and means cooperating with said frame and said sleeve for yieldingly resisting the swing of said frame when swung to light in said plane.

ERWIN EICHENBERGER.